US011281351B2

(12) United States Patent
Nguyen et al.

(10) Patent No.: US 11,281,351 B2
(45) Date of Patent: Mar. 22, 2022

(54) SELECTING OBJECTS WITHIN A THREE-DIMENSIONAL POINT CLOUD ENVIRONMENT

(71) Applicant: Adobe Inc., San Jose, CA (US)

(72) Inventors: Cuong Nguyen, San Francisco, CA (US); Stephen DiVerdi, Berkeley, CA (US); Kazi Rubaiat Habib, Seattle, WA (US); Roberto Montano Murillo, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/685,581

(22) Filed: Nov. 15, 2019

(65) Prior Publication Data

US 2021/0149543 A1 May 20, 2021

(51) Int. Cl.
*G06F 3/0481* (2013.01)
*G06F 3/0484* (2013.01)
*G06F 3/0488* (2013.01)
*G06T 15/06* (2011.01)
*G06F 3/01* (2006.01)
*G06F 3/04815* (2022.01)
*G06F 3/04842* (2022.01)

(52) U.S. Cl.
CPC .......... *G06F 3/04815* (2013.01); *G06F 3/016* (2013.01); *G06F 3/0488* (2013.01); *G06F 3/04842* (2013.01); *G06T 15/06* (2013.01)

(58) Field of Classification Search
None
See application file for complete search history.

(56) References Cited

U.S. PATENT DOCUMENTS

| | | | | |
|---|---|---|---|---|
| 2007/0279436 | A1* | 12/2007 | Ng | G16H 40/63 345/624 |
| 2014/0047378 | A1* | 2/2014 | Hirakawa | G06T 15/08 715/782 |
| 2014/0378222 | A1* | 12/2014 | Balakrishnan | A63F 13/70 463/31 |
| 2016/0018872 | A1* | 1/2016 | Tu | G06F 1/3287 345/173 |

OTHER PUBLICATIONS

John F. Lucas III, "Design and Evaluation of 3D Multiple Object Selection Techniques", Jan. 2005, Virginia Polytechnic Institute and State University, Master's thesis, pp. 1-80.*

(Continued)

*Primary Examiner* — Robert Bader
(74) *Attorney, Agent, or Firm* — Kilpatrick Townsend & Stockton LLP

(57) ABSTRACT

Techniques for interacting with virtual environments. For example, a virtual reality application outputs a three-dimensional virtual reality scene. The application receives a creation of a slicing volume that is positioned within the three-dimensional virtual space. The slicing volume includes virtual elements of an object within the scene. The application projects the slicing volume onto a two-dimensional view. The application displays the two-dimensional view within the three-dimensional virtual reality scene. The application associates a surface of a physical object with the two-dimensional view. The application receives an interaction with the surface of the physical object, and based on the interaction, selects one or more virtual elements.

18 Claims, 10 Drawing Sheets

(56) References Cited

OTHER PUBLICATIONS

J. Schild, T. Holtkämper, M. Bogen, "The 3D Sketch Slice: Precise 3D Volume Annotations in Virtual Environments", 2009, Eurographics Association, Joint Virtual Reality Conference of EGVE-ICAT-EuroVR (2009), pp. 65-72.*
Ki-Uk Kyung, Jun-Young Lee, "Ubi-Pen: A Haptic Interface with Texture and Vibrotactile Display", Feb. 2009, IEEE, IEEE Computer Graphics and Applications, vol. 29, Issue 1, pp. 56-64.*
Peng Song, Wooi Boon Goh. Chi-Wing Fu, Qiang Meng, Pheng-Ann Heng, "WYSIWYF: Exploring and Annotating Volume Data with a Tangible Handheld Device", May 12, 2011, ACM, CHI 2011, pp. 1333-1342.*
Mickael Sereno, Mehdi Ammi, Tobias Isenberg, Lonni Besançon, "Tangible Brush: Performing 3D Selection with Portable and Position-aware Devices", Oct. 2016, IEEE, IEEE VIS2016.*
Mike Fraser, Jon Hindmarsh, Steve Benford, Christian Heath, "Getting the Picture: Enhancing Avatar Representations in Collaborative Virtual Environments", 2004, Springer, Inhabited Information Spaces. Computer Supported Cooperative Work, vol. 29, chapter 9, pp. 133-150.*
Afonso et al., Effect of Hand-avatar in a Selection Task Using a Tablet as Input Device in an Immersive Virtual Environment, 3D User Interfaces (3DUI), IEEE Symposium, Available Online at https://doi.org/10.1109/3DUI.2017.7893364, 2017, 2 pages.
Agrawala et al., 3D Painting on Scanned Surfaces, Proceedings of the 1995 Symposium on Interactive 3D Graphics, Available Online at: https://doi.org/10.1145/199404.199429, 1995, pp. 145-215.
Altahawi et al., 3D MRI in Musculoskeletal Imaging: Current and Future Applications, Current Radiology Reports, vol. 6, No. 8, Available Online at: https://doi.org/10.1007/s40134-018-0287-3, 2018, pp. 27-1-27-14.
Argelaguet et al., A Survey of 3D Object Selection Techniques for Virtual Environments, Computers & Graphics, vol. 37, No. 3, Available Online at: https://doi.org/10.1016/j.cag.2012.12.003, 2013, 19 pages.
Arora et al., Experimental Evaluation of Sketching on Surfaces in VR, in CHI, Available Online at http://dx.doi.org/10.1145/3025453.3025474, 2017, 12 pages.
Arora et al., SketchSoup: Exploratory Ideation Using Design Sketches, In Computer Graphics Forum, Wiley Online Library, vol. 36, No. 8, Available Online at: https://doi.org/10.1111/cgf.13081, 2017, 11 pages.
Arora et al., SymbiosisSketch: Combining 2D & 3D Sketching for Designing Detailed 3D Objects in Situ, Proceedings of the 2018 Chi Conference on Human Factors in Computing Systems, Available Online at https://doi.org/10.1145/3173574.3173759, Apr. 21-26, 2018, 15 pages.
Aspin et al., Augmenting the Cave: An Initial Study into Close Focused, Inward Looking, Exploration in IPT Systems, 11th IEEE International Symposium on Distributed Simulation and Real-Time Applications, Available Online at: https://doi.org/10.1109/DS-RT.2007.9, 2007, 8 pages.
Bacim et al., Design and Evaluation of 3D Selection Techniques Based on Progressive Refinement, International Journal of Human-Computer Studies, vol. 71, No. 7-8, Available Online at https://doi.org/10.1016/j.ijhcs.2013.03.003, 2013, 61 pages.
Benko et al., Balloon Selection: A Multi-finger Technique for Accurate Low-fatigue 3D Selection, IEEE Symposium on 3D User Interfaces, Available Online at: https://doi.org/10.1109/3DUI.2007.340778, 2007, 8 pages.
Besancon et al., Hybrid Tactile/Tangible Interaction for 3D Data Exploration, IEEE transactions on visualization and computer graphics, vol. 23, No. 1, Available online at: https://doi.org/10.1109/TVCG.2016.2599217, Jan. 2017, 10 pages.
Surale et al., TabletInVR: Exploring the Design Space for Using a Multi-Touch Tablet in Virtual Reality, In Proceedings of the 2019 CHI Conference on Human Factors in Computing Systems, No. 13, Available Online at https://doi.org/10.1145/3290605.3300243, May 4-9, 2019, 13 pages.
Billinghurst et al., 3D Palette: A Virtual Reality Content Creation Tool, Proceedings of the ACM Symposium on Virtual Reality Software and Technology, Available Online at: https://doi.org/10.1145/261135.261163, 1997, pp. 155-156.
Bornik et al., A Hybrid User Interface for Manipulation of Volumetric Medical Data, 3D User Interfaces (3DUI'06), Available Online at: http://doi.ieeecomputersociety.org/10.1109/VR.2006.8, 2006, 8 pages.
Bowman et al., 3D User Interfaces: Theory and Practice, Addison-Wesley Professional, 2017, 85 pages.
Bowman et al., Design and Evaluation of Menu Systems for Immersive Virtual Environments, Proceedings IEEE Virtual Reality, Available Online at: https://doi.org/10.1109/VR.2001.913781, 2001, 8 pages.
Bowman et al., Formalizing the Design, Evaluation, and Application of Interaction Techniques for Immersive Virtual Environments, Journal of Visual Languages & Computing, vol. 10, No. 1, Available Online at: https://doi.org/10.1006/jvlc.1998.0111, 1999, pp. 37-53.
Bowman et al., Virtual-SAP: An Immersive Tool for Visualizing the Response of Building Structures to Environmental Conditions, IEEE Virtual Reality, Available Online at: https://doi.org/10.1109/VR.2003.1191146, 2003, 8 pages.
Cheveau, 3D Scanning Solution for Textured Object using Photometric Stereo with Multiple Known Light Sources, Archiving Conference, Society for Imaging Science and Technology, Available Online at: https://doi.org/10.2352/issn.2168-3204.2018.1.0.3, 2018, 1 page.
Cockburn et al., Improving the Acquisition of Small Targets, People and Computers XVII—Designing for Society, Available Online at: https://doi.org/10.1007/978-1-4471-3754-2_11, 2004, 16 pages.
Cohen et al., Statistical Power Analysis for the Behavioral Sciences, Lawrence Earlbaum Associates, Available Online at: https://www.taylorfrancis.com/books/9781134742707, 1988, 579 pages.
Cruz-Neira et al., Scientists in Wonderland: A Report on Visualization Applications in the CAVE Virtual Reality Environment, IEEE Research Properties in Virtual Reality Symposium, Available Online at: https://doi.org/10.1109/VRAIS.1993.378262, 1993, pp. 59-66.
Cumming et al., Error Bars in Experimental Biology, The Journal of cell Biology, vol. 177, No. 1, Available Online at: https://doi.org/10.1083/jcb.200611141, 2007, pp. 7-11.
De Haan et al., Towards Intuitive Exploration Tools for Data Visualization in VR, Proceedings of the ACM Symposium on Virtual Reality Software and Technology, Available Online at: https://doi.org/10.1145/585740.585758, 2002, 11 pages.
Dias et al., Mobile Devices for Interaction in Immersive Virtual Environments, International Conference on Advanced Visual Interfaces, Available Online at: https://doi.org/10.1145/3206505.3206526, 2018, 9 pages.
Forsberg et al., Aperture Based Selection for Immersive Virtual Environments, ACM Symposium on User Interface Software and Technology, Available Online at: https://doi.org/10.1145/237091.237105, 1996, 2 pages.
Giesler et al., Void Shadows: Multi-Touch Interaction with Stereoscopic Objects on the Tabletop, Proceedings of the 2nd ACM Symposium on Spatial User Interaction, Available Online at: https://doi.org/10.1145/2659766.2659779, 2014, pp. 104-112.
Grossman et al., The Bubble Cursor: Enhancing Target Acquisition by Dynamic Resizing of the Cursor's Activation Area, Proceedings of the SIGCHI Conference on Human Factors in Computing Systems, Available Online at: https://doi.org/10.1145/1054972.1055012, 2005, pp. 281-290.
Grossman et al., The Design and Evaluation of Selection Techniques for 3D Volumetric Displays, Proceedings of the 19th Annual ACM Symposium on User Interface Software and Technology, Available Online at: https://doi.org/10.1145/1166253.1166257, 2006, 10 pages.
Herndon, The Challenges of 3D Interaction: a CHI'94 Workshop, ACM SIGCHI Bulletin, vol. 2, No. 4, Available Online at: https://doi.org/10.1145/191642.191652, 1994, pp. 36-43.

(56) References Cited

OTHER PUBLICATIONS

Hinckley et al., Passive Real-world Interface Props for Neurosurgical Visualization, Proceedings of the SIGCHI Conference on Human Factors in Computing Systems, Available Online at: https://doi.org/10.1145/191666.191821, 1994, pp. 452-458.
Izadi et al., Kinectfusion: Real-time 3D Reconstruction and Interaction Using a Moving Depth Camera, Proceedings of the 24th Annual ACM Symposium on User Interface Software and Technology, Available Online at: https://doi.org/10.1145/2047196.2047270, 2011, pp. 559-568.
Jackson et al., Yea Big, Yea High: A 3D User Interface for Surface Selection by Progressive Refinement in Virtual Environments, IEEE Conference on Virtual Reality and 3D User Interfaces, Available Online at: https://doi.org/10.1109/VR.2018.8447559, 2018, 7 pages.
Janoos et al., Visual Analysis of Brain Activity from fMRI Data, Computer Graphics Forum, Available Online at: https://doi.org/10.1111/j.1467-8659.2009.01458.x, 2009, 8 pages.
Jones et al., Human Hand Function, Oxford University Press, 2006, 1 page.
Keefe et al., Drawing on Air: Input Techniques for Controlled 3D Line Illustration, IEEE Transactions on Visualization and Computer Graphics, vol. 13, No. 5, Available Online at: https://doi.org/10.1109/TVCG.2007.1060, 2007, pp. 1067-1081.
Kim et al., Finger Walking in Place (FWIP): A Traveling Technique in Virtual Environments, International Symposium on Smart Graphics, Available Online at: https://doi.org/10.1007/978-3-540-85412-8_6, 2008, 12 pages.
Kopper et al., Rapid and Accurate 3D Selection by Progressive Refinement, IEEE Symposium on 3D User Interfaces, Available Online at: https://doi.org/10.1109/3DUI.2011.5759219, 2011, 8 pages.
Liang et al., JDCAD: A Highly Interactive 3D Modeling System, Computers & Graphics, vol. 18, No. 4, Available Online at: https://doi.org/10.1016/0097-8493(94)90062-0, 1994, 8 pages.
Lindeman, Bimanual Interaction, Passive-Haptic Feedback, 3 D Widget Representation, and Simulated Surface Constraints for Interaction in Immersive Virtual Environments, George Washington University, Available Online at: https://web.cs.wpi.edu/~gogo/papers/lindeman_thesis.pdf, 1999, 148 pages.
Lucas, Design and Evaluation of 3D Multiple Object Selection Techniques, Virginia Tech, Available Online at: http://hdl.handle.net/10919/31769, 2005, 1 page.
McKeown et al., Independent Component Analysis of Functional MRI: What is Signal and What is Noise?, Current Opinion in Neurobiology, vol. 13, No. 5, Available online at: https://doi.org/10.1016/j.conb.2003.09.012, Oct. 2003, pp. 620-629.
Medeiros et al., A Tablet-Based 3D Interaction Tool for Virtual Engineering Environments, Proceedings of the 12th ACM SIGGRAPH International Conference on Virtual-Reality Continuum and Its Applications in Industry, Available online at: https://doi.org/10.1145/2534329.2534349, Nov. 17-19, 2013, pp. 211-218.
Medeiros et al., Proposal and Evaluation of a Tablet-based Tool for 3D Virtual Environments, SBC Journal on 3D Interactive Systems, vol. 4, No. 2, Jan. 2013, 13 pages.
Mendes et al., Design and Evaluation of a Novel Out-of-reach Selection Technique for VR Using Iterative Refinement, Computers & Graphics, vol. 67, Available online at: https://doi.org/10.1016/j.cag.2017.06.003, Oct. 2017, 13 pages.
Mine, Virtual Environment Interaction Techniques, Department of Computer Science, University of North Carolina, Chapel Hill, 1995, 18 pages.
Mossel et al., DrillSample: Precise Selection in Dense Handheld Augmented Reality Environments, Proceedings of the Virtual Reality International Conference: Laval Virtual, Article No. 10, Mar. 20-22, 2013, 10 pages.
Mossel et al., Large Scale Cut Plane: An Occlusion Management Technique for Immersive Dense 3D Reconstructions, Proceedings of the 22nd ACM Conference on Virtual Reality Software and Technology, Available online at: https://doi.org/10.1145/2993369.2993384, Nov. 2-4, 2016, pp. 201-210.
Obermaier et al., An Automated Approach for Slicing Plane Placement in Visual Data Analysis, IEEE Transactions on Visualization and Computer Graphics, vol. 21, No. 12, Available Online at: https://doi.org/10.1109/TVCG.2015.2414455, Mar. 18, 2015, 12 pages.
Olwal et al., The Flexible Pointer: An Interaction Technique for Selection in Augmented and Virtual Reality, In Conference Supplement of ACM Symposium on User Interface Software and Technology, Nov. 2-5, 2003, pp. 81-82.
Peeters et al., The Use of Super-Resolution Techniques to Reduce Slice Thickness in Functional MRI, International Journal of Imaging Systems and Technology, vol. 14, No. 3, Available online at: https://doi.org/10.1002/ima.20016, Jan. 2004, pp. 131-138.
Poupyrev et al., Virtual Notepad: Handwriting in Immersive VR, IEEE Proceedings in Virtual Reality Annual International Symposium, Available online at: https://doi.org/10.1109/VRAIS.1998.658467, Mar. 1998, 7 pages.
Prior, "On-the-Fly" Voxelization for 6 Degrees-of-Freedom Haptic Virtual Sculpting, Proceedings of the ACM International Conference on Virtual Reality Continuum and Its Applications, Available online at https://doi.org/10.1145/1128923.1128966, Jan. 2006, pp. 263-270.
Reitmayr et al., Mobile Collaborative Augmented Reality, Proceedings IEEE and ACM International Symposium on Augmented Reality, Available online at: https://doi.org/10.1109/ISAR.2001.970521, Oct. 29-30, 2001, 10 pages.
Ribarsky et al., Visualization and Analysis Using Virtual Reality, IEEE Computer Graphics and Applications, vol. 14, No. 1, Available online at: https://doi.org/10.1109/38.250911, Jan. 1994, pp. 10-12.
Rosa, Selection Techniques for Dense and Occluded Virtual 3D Environments, Supported by Depth Feedback: Double, Bound and Depth Bubble Cursors, XXIX International Conference of the Chilean Computer Science Society, Available online at: https://doi.org/10.1109/SCCC.2010.51, Nov. 15-19, 2010, 8 pages.
Schkolne et al., Surface Drawing: Creating Organic 3D Shapes with the Hand and Tangible Tools, Proceedings of the SIGCHI Conference on Human Factors in Computing Systems, vol. 3, No. 1, Available online at: https://doi.org/10.1145/365024.365114, Mar. 31-Apr. 5, 2001, pp. 261-268.
Schmalstieg et al., Using Transparent Props for Interaction with the Virtual Table, Proceedings of the Symposium on Interactive 3D Graphics, vol. 99, Available online at: https://doi.org/10.1145/300523.300542, Apr. 26-29, 1999, pp. 147-153.
Shan et al., Interactive Visual Exploration of Halos in Large-Scale Cosmology Simulation, Journal of Visualization, vol. 17, No. 3, Available online at: https://doi.org/10.1007/s12650-014-0206-5, Aug. 2014, 9 pages.
Sridhar et al., Investigating the Dexterity of Multi-Finger Input for Mid-Air Text Entry, Proceedings of the 33rd Annual ACM Conference on Human Factors in Computing Systems, Available online at: http://dx.doi.org/10.1145/2702123.2702136, Apr. 18-23, 2015, pp. 3643-3652.
Strothoff et al., Triangle Cursor: Interactions with Objects Above the Tabletop, Proceedings of the ACM International Conference on Interactive Tabletops and Surfaces, Available online at: https://doi.org/10.1145/2076354.2076377, Nov. 13-16, 2011, pp. 111-119.
Sunden et al., Hybrid Virtual Reality Touch Table: An Immersive Collaborative Platform for Public Explanatory Use of Cultural Objects and Sites, 15th Eurographics Workshop on Graphics and Cultural Heritage, Available Online at: https://doi.org/10.2312/gch.20171300, Sep. 27-29, 2017, pp. 109-113.
Szalavari et al., The Personal Interaction Panel—a Two-handed Interface for Augmented Reality, Computer Graphics Forum, Available Online at: https://doi.org/10.1111/1467-8659.00137, 1997, 7 pages.
Takahashi, Pcx—Point Cloud Importer/Renderer for Unity, Available Online at: https://github.com/keijiro/Pcx, 2017, 3 pages.
Vanacken et al.. Multimodal Selection Techniques for Dense and Occluded 3D Virtual Environments, International Journal of Human-Computer Studies, vol. 67, No. 3, Available online at: https://doi.org/10.1016/j.ijhcs.2008.09.001, Mar. 2009, 2 pages.

(56) References Cited

OTHER PUBLICATIONS

Wang et al., Coordinated 3D Interaction in Tablet-and HMD-based Hybrid Virtual Environments, Proceedings of the 2nd ACM Symposium on Spatial User Interaction, Available Online at: https://doi.org/10.1145/2659766.2659777, 2014, pp. 70-79.

Wang et al., Object Impersonation: Towards Effective Interaction in Tablet-and HMD-based Hybrid Virtual Environments, Virtual Reality, Available online at: https://doi.org/10.1109/VR.2015.7223332, Mar. 23-27, 2015, 8 pages.

Yu et al., CAST: Effective and Efficient User Interaction for Context-aware Selection in 3D Particle Clouds, IEEE Transactions on Visualization and Computer Graphics, vol. 22, No. 1, 2016, pp. 886-895.

Yu et al., Efficient Structure-aware Selection Techniques for 3D Point Cloud Visualizations With 2DOF Input, IEEE Transactions on Visualization and Computer Graphics, vol. 18, No. 12, Available Online at: https://doi.org/10.1109/TVCG.2012.217, 2012, 10 pages.

\* cited by examiner

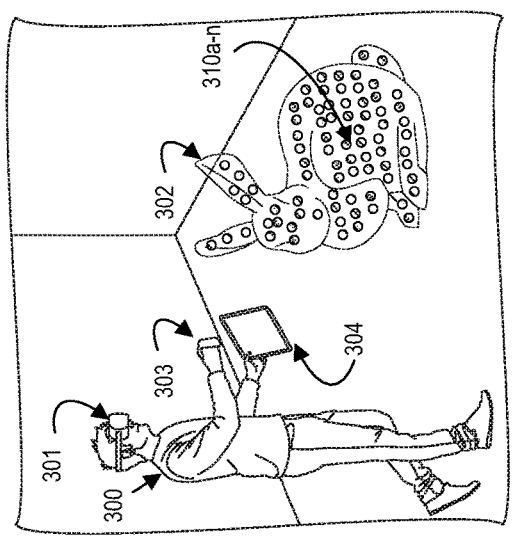
FIG. 3A
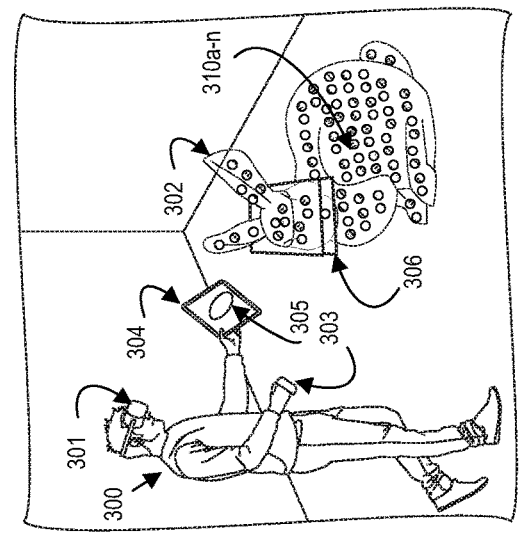
FIG. 3B
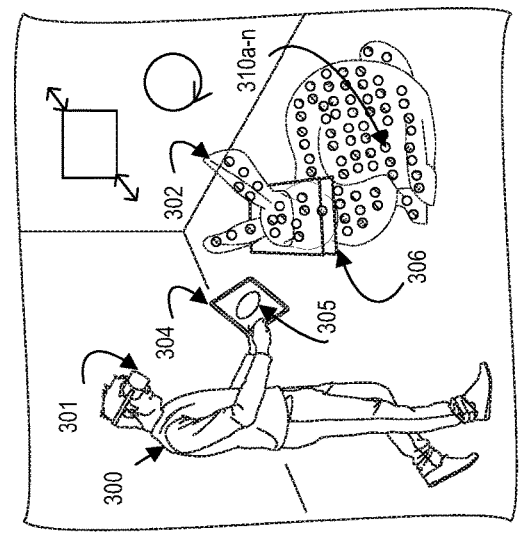
FIG. 3C
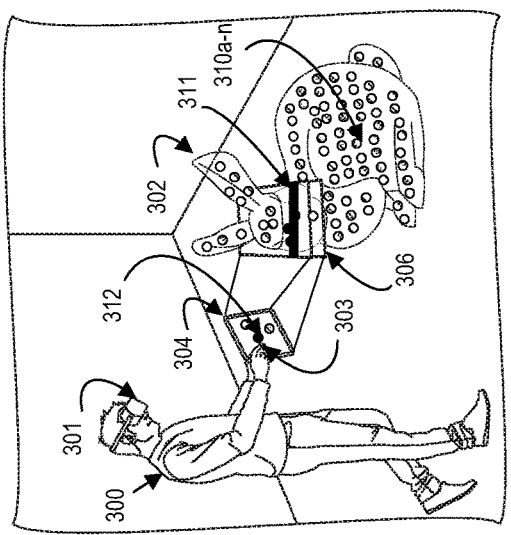
FIG. 3E
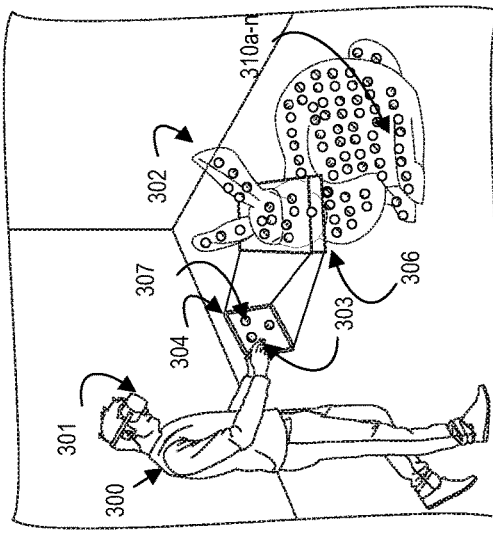
FIG. 3D
FIG. 3

SELECTING OBJECTS WITHIN A THREE-DIMENSIONAL POINT CLOUD ENVIRONMENT

TECHNICAL FIELD

This disclosure generally relates to interacting with virtual objects in digital environments. More specifically, but not by way of limitation, this disclosure relates to improved techniques for selecting elements displayed within a three-dimensional virtual reality environment.

BACKGROUND

In virtual reality (VR) environments, a user can interact with three-dimensional (3D) objects as viewed through a headset or other display. The objects may include different elements. In some cases, an object can be represented by a dense point cloud with the elements corresponding to points in the point cloud. For example, a 3D representation of a bone identified from a medical scan can include many points, or elements. The ability to perform group selection—the selection of one or more elements from the object—is important for the usability of the virtual environment. Continuing the above example, a user may desire to select multiple points from the bone for further analysis.

But conventionally, selections within a 3D virtual reality environment can be difficult because from the user's perspective, elements may be occluded by other elements. Additionally, in some conventional solutions, selection of elements using mid-air hand gestures with a VR controller results in instability and user fatigue, which in turn, can cause a selection of undesired elements.

SUMMARY

Techniques are disclosed herein for interacting with virtual environments. In an example, a method outputs via an output device, a three-dimensional virtual reality scene depicting a view of a three-dimensional virtual space. The method further determines a portion, of the three-dimensional virtual space, contained within a slicing volume positioned within the three-dimensional virtual space. The portion of the three-dimensional virtual space contains virtual elements. The method further projects the slicing volume onto a two-dimensional view. The projecting includes mapping the virtual elements onto the two-dimensional view. The method further displays the two-dimensional view within the three-dimensional virtual reality scene. The method further associates a surface of a physical object with the two-dimensional view. The association enables an interaction with the surface to be mapped to an interaction with the two-dimensional view displayed in the three-dimensional virtual reality scene. The method further receives information indicative of an interaction with an area on the surface of the physical object. The method, responsive to the interaction, selects a set of one or more virtual elements from the virtual elements.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

FIG. 3, which includes FIGS. 3A-3E, depicts examples of selecting elements within a virtual reality scene, in accordance with an embodiment.

FIGS. 8A-8C, depicts examples of using ray casting to select elements within a virtual reality scene, in accordance with an embodiment.

DETAILED DESCRIPTION

Figure 1:
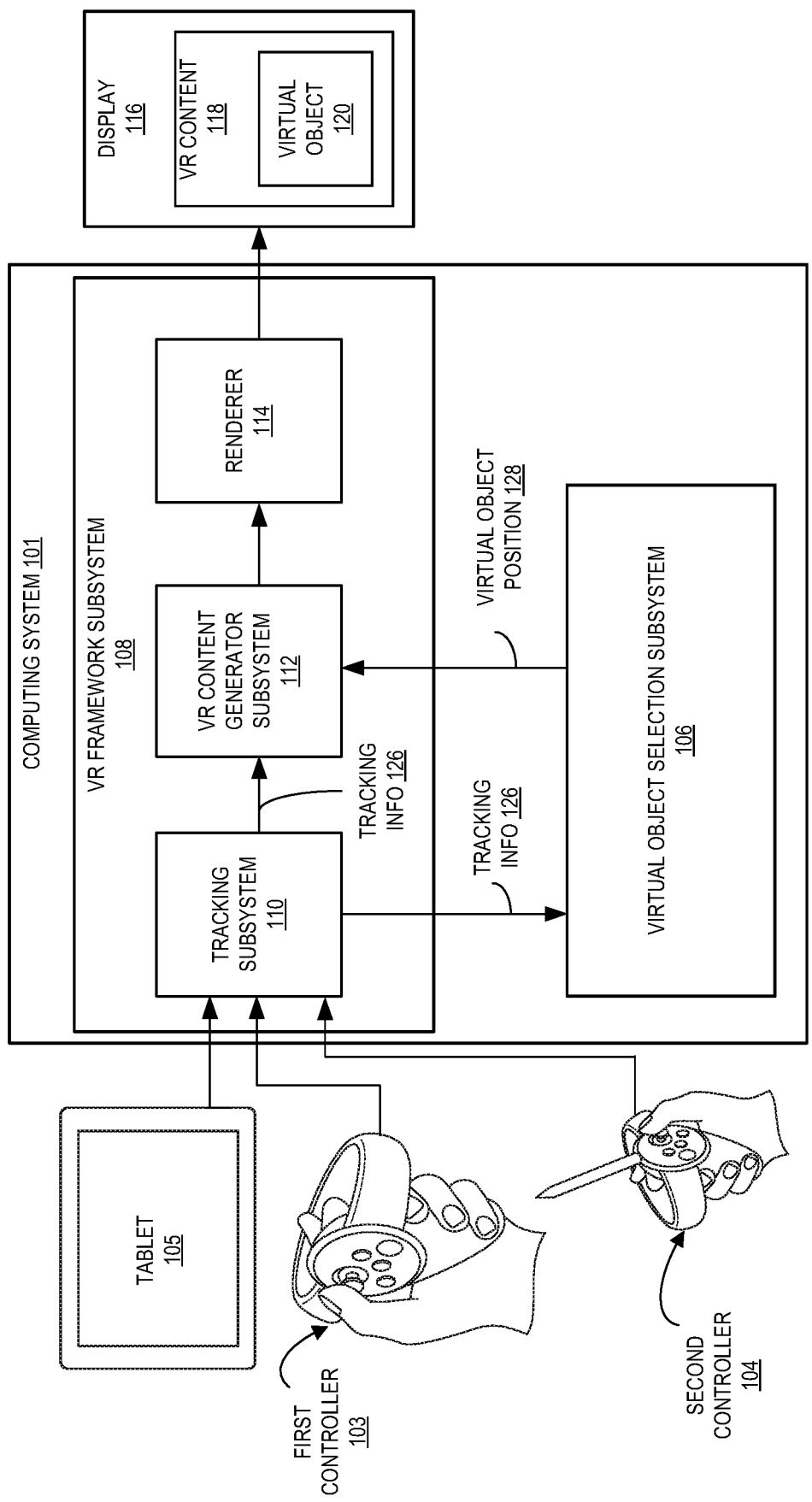
FIG. 1 depicts an example of a computing environment including a virtual object selection subsystem for positioning a virtual object within a virtual reality scene in cooperation with a VR framework subsystem, in accordance with an embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure generally relates to interacting with virtual objects in a digital environment such as a virtual reality (VR) environment and more specifically to improved techniques that enable more accurate and convenient selections of elements displayed in a three-dimensional (3D) VR environment. An object (3D or otherwise) in a 3D VR scene can include one or more virtual elements. A virtual element (or an element) is an object or a portion of an object. In some cases, an object is represented by a dense point cloud with virtual elements corresponding to the points in the point cloud. By using a combination of mid-air and tablet-based selection techniques, disclosed techniques are especially useful for selecting one or more elements in such point clouds.

As discussed, existing solutions for selecting an element or multiple elements (e.g., groups of elements) in a 3D VR environment suffer from deficiencies. A user may wish to select one or more of the displayed elements of a 3D model of an object. But in some instances, a point cloud can contain tens, hundreds, thousands, even millions of points, each point representing an element that is selectable by the user. Accordingly, due to the size and the number of elements, accurately selecting the desired elements using only conventional hand gesture-based interactions is very difficult and over time, can lead to user fatigue (for example, by requiring a user to hold a controller in mid-air), thereby further degrading the selection accuracy. Further, due to the 3D nature of the environment and given the size and number of the elements, some of the elements to be selected may be occluded by other elements, making their precise selection even more difficult.

Examples of use cases for disclosed techniques include viewing objects and elements contained within 3D models obtained by photometric scanning, magnetic resonance imaging (MRI), computed tomography (CT) scanning, and sonar. For example, an MRI scan may reveal one or more objects such as bones, including elements such as point clouds representing the bones. Similarly, a scan of the ocean floor may result in 3D objects such as coral, debris, or shipwrecks. In these applications, the ability to easily select one or more elements facilitates improved access to unstructured three-dimensional data. For example, editing, adjusting, and analysis of the data can be more easily performed. These techniques enable virtual exploration of infrastructure in virtual reality and sculpting and painting in virtual reality.

In particular, disclosed techniques enable a user to create a slicing volume, which is a defined three-dimensional region that intersects with an object in a virtual reality environment. A slicing volume can include one or more virtual elements. The user can create a slicing volume by defining its boundaries or area. The user can place the slicing volume in the desired area of the VR scene. With the slicing volume created, disclosed techniques project the elements contained within the slicing volume onto a two-dimensional view that is displayed within the virtual reality scene. The two-dimensional view can be mapped to a two-dimensional physical object such as a surface of a tablet or other device, enabling easier user interactions. For example, user interactions with the physical object can translate to interactions with the elements displayed in the 2D projection of the slicing volume as displayed in the 2D view in the VR scene. These interactions cause a ray to be traced through the slicing volume to select the desired elements. Additionally, as the tablet moves, the pose of the tablet (its location and orientation in the VR scene) is tracked and the 2D projection is updated accordingly.

The use of a slicing volume and associated techniques reduces occlusion of elements in the scene. For example, a user can create, place, and adjust the slicing volume in such a manner as to include a set of desired elements while excluding any undesired elements. Then, with the slicing volume mapped to the tablet surface, the user can select the desired elements by interacting with the tablet surface rather than directly interacting with a three-dimensional environment. The tablet surface allows for interactions on the surface of the tablet such as touch, tap, or drag and can be used to create and refine the slicing volume. By using the tablet surface, the user can benefit from more stability (e.g., less wobbling by the user). Further, because the user need not hold the controllers in the air for an extended period of time and can perform the selection of elements using the tablet surface, user fatigue is minimized, thereby also increasing accuracy during long periods of user interaction.

The following non-limiting example is introduced for discussion purposes. A user interacts with a virtual reality environment using a headset, a tablet, and two VR controllers. One controller is attached to the user's left hand and the other controller is attached to the user's right hand. The user wears the headset, which depicts objects and elements within the environment, as well as a visual representation of any content mapped to the tablet surface. The environment includes a 3D representation of a dinosaur object. The dinosaur is represented by a point cloud, each point represented by multiple elements. The point cloud could have been generated by performing a three-dimensional scan of a physical dinosaur object.

Continuing the example, the user wishes to select a certain part, but not all, of the dinosaur. For example, the user may want to select those elements representing the tail of the dinosaur. Accordingly, the user creates, within the virtual reality environment, a slicing volume that includes the desired elements. Creation of a slicing volume can be accomplished in different ways. In a first use case, the user creates a slicing volume having certain dimensions (e.g., length, height, width) and positions the slicing volume over a portion of the dinosaur that contains the desired elements. For example, the user places the slicing volume around the tail of the dinosaur. In a second use case, the user lifts one of the controllers up to be level with the tail of the dinosaur and performs a mid-air gesture with a controller to create the slicing volume. In a third use case, the user raises the tablet such that the back of the tablet surface faces a front of the desired slicing volume. The user may adjust the size or position of the slicing volume, thereby fine tuning the slicing volume to include or exclude various elements. By constraining the size and/or position of the slicing volume, only a desired subset of elements can be projected to the tablet, thereby minimizing any occlusion of elements.

In response, the virtual reality environment recognizes the creation of the slicing volume and projects a two-dimensional representation of the slicing volume onto a two-dimensional view. The two-dimensional view can be associated with the tablet surface such that interactions on a specific area on the tablet surface (e.g., selections of elements) are mapped to a corresponding area within the two-dimensional view (thereby enabling interactions with the virtual reality environment). The tablet surface can then be used in the virtual reality environment because the tablet surface can be associated with the two-dimensional view. The user may then interact with the slicing volume in two-dimensions via the tablet surface. For example, a user can select an element in the two-dimensional view by selecting a corresponding associated element on the tablet surface.

Additionally or alternatively, the two-dimensional view can be associated with the tablet surface such that the two-dimensional view is updated as a position and orientation within the environment (e.g., 3D pose) of the tablet change due to movement by the user. For example, a two-dimensional view of a first part of an object is updated to be a new two-dimensional view of a second part of the object as the user moves the tablet within the environment. Further, the tablet surface need not display the two-dimensional representation. Instead, the virtual reality environment can display the projection within the three-dimensional environment to the user (e.g., via the headset) as if the projection appears on the tablet surface.

Continuing the example, the user selects an element of the dinosaur by touching the tablet with a finger or a stylus. The position of interaction on the tablet surface indicates the starting position of a ray that is casted through the slicing volume. All elements on the path of the ray that are contained within the volume are selected. Following selection, the elements can be used to create an additional object, shared with other devices, or stored to a memory. The user can also create a different slicing volume and select additional elements.

CERTAIN DEFINITIONS

As used herein, group selection refers to a process of selecting one or more elements in space. The elements can be associated with an object, but be separately selectable. For example, for an object that is a bone, a user might choose to select only elements in the vicinity of a break in the bone.

As used herein, a slicing volume refers to a three-dimensional volume that can include one or more objects or elements. The objects and elements can be separately selected. Regions from with the slicing volume can also be selected. In some cases, the size of the slicing volume can be adjusted, which enables either selection of a large set of elements (by increasing its size) or selection of occluded elements (by decreasing its size).

As used herein, translating a virtual object refers to moving a virtual object from one location to another location within a scene in a digital environment. For example, in a scene in a 3D environment (e.g., a 3D VR scene) defined by a Cartesian coordinate system, a virtual object's location in the digital environment may be specified by coordinates (x, y, z). The virtual object's initial location in the digital environment may be represented by $(x_i, y_i, z_i)$. When the virtual object is translated or moved, the virtual object is moved by a certain distance from its initial location to a new location within the scene in the digital environment, wherein the new location is represented by coordinates $(x_n, y_n, z_n)$, where at least one coordinate representing the new location has a different value from its corresponding coordinate in the initial location. For purposes of this disclosure, the term moving is synonymous to translating.

Turning now to the figures, FIG. 1 depicts an example of a computing environment including a virtual object selection subsystem for positioning a virtual object within a virtual reality scene in cooperation with a VR framework subsystem, in accordance with an embodiment. Computing environment 100 may include multiple systems and subsystems communicatively coupled to each other. For example, as depicted, computing system 101 includes one or more of a first controller 103, a second controller 104, tablet 105, virtual object selection subsystem 106, VR framework system 108, and display 116. Computing system 101 depicted in FIG. 1 is merely an example and is not intended to limit the scope of claimed embodiments. For example, in some implementations, computing system 101 may have more or fewer systems or subsystems than those shown in FIG. 1, may combine two or more systems or subsystems, or may have a different configuration or arrangement of the subsystem.

The computing system 101 includes functionality to receive input from a user. For example, the first controller 103 and second controller 104 can include one or more sensors or controls. For example, the sensors include hardware and/or software capable of capturing location and orientation information associated with the computing system 101. Examples of types of sensors include a gyroscope, a Global Positioning System (GPS) receiver, a Light Detection and Ranging (LIDVR) receiver, a sonar receiver, an accelerometer, a Passive Infrared (PIR) sensor, and a camera (e.g., enabled with a filter to selectively receive infrared light). Interacting with controllers and a tablet provides passive haptic feedback to the user. Passive haptic feedback refers to a sensation interacting with a physical object. In some cases, the controllers can provide active haptic feedback to user, such as via a motor or another device that makes vibrations.

Figure 6:
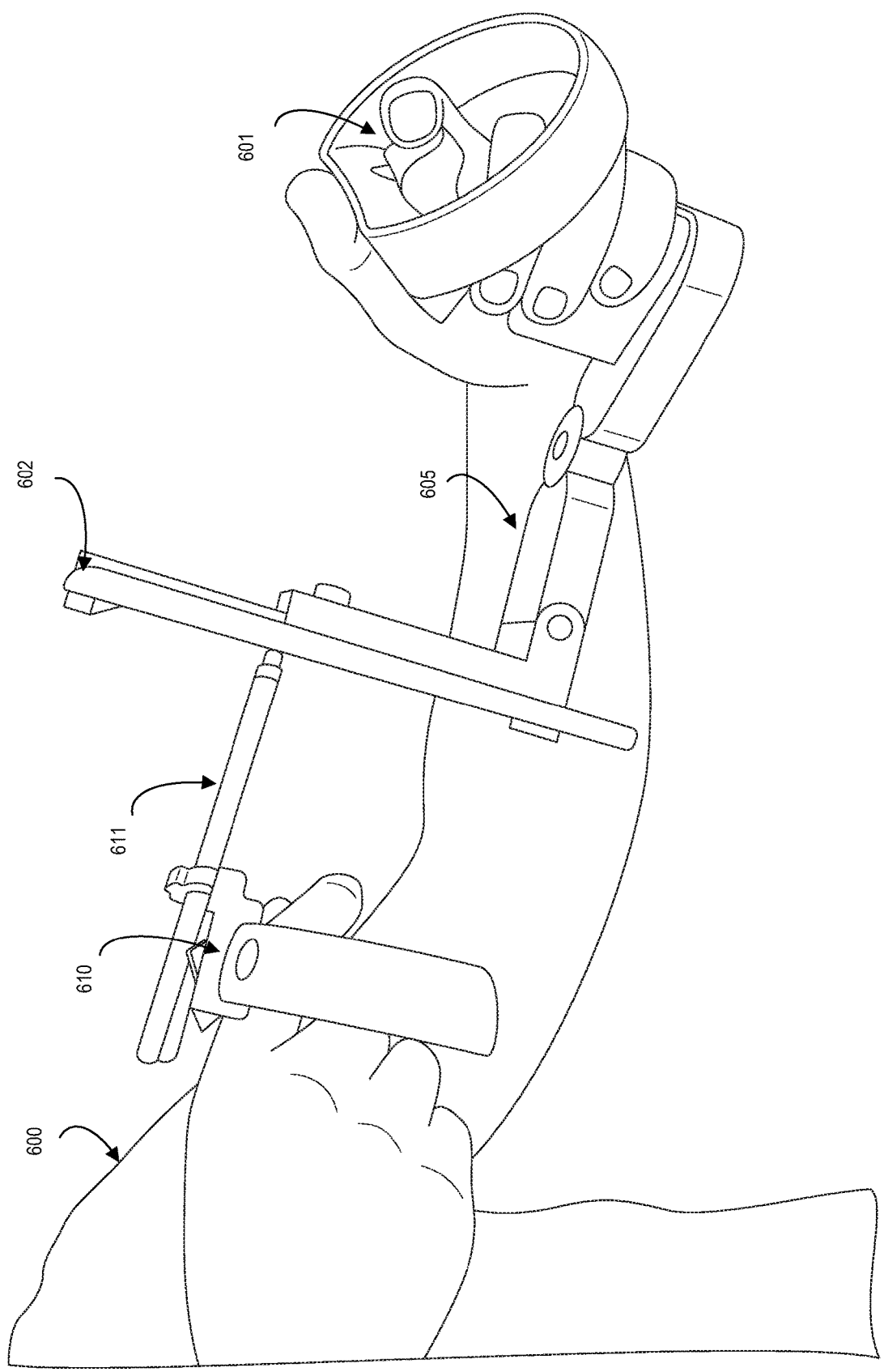
FIG. 6 is a diagram depicting an example of using a tablet surface for interacting with a virtual reality scene, in accordance with an embodiment.

Tablet 105 includes a physical tablet surface on which user input can be received. For example, tablet 105 can receive input from a finger touch, stylus or other device and provide the input to VR framework subsystem 108. Examples of tablet 105 include tablet computers, smart phones, and other device surfaces that can be configured to receive user input by capacitive touch or other mechanism. For example, elements of a slicing volume can be selected via interacting with the surface of tablet 105. In some cases, tablet 105 can be physically attached to the first controller 103 or second controller 104 (for example, as depicted in FIG. 6). Such a configuration can facilitate easier interaction on the part of the user because the user need not hold a tablet and a controller in one hand. In this manner, the user can hold tablet 105 and a first controller in one hand while he/she uses a second controller to interact with the VR environment.

In some embodiments, user input may be received via the display 116 (e.g., via a touchscreen on display 116). The user input may correspond to an indication of one or more elements on the display 116. The user input may be a user touch on the display 116 and/or a voice command.

The VR framework subsystem 108 includes hardware and/or software configured to generate an VR environment. In some embodiments, the VR framework subsystem 108 includes a tracking subsystem 110, an VR content generator subsystem 112, and a renderer 114.

Tracking subsystem 110 can be configured to perform tracking during a VR session. The tracking subsystem 110 includes hardware and/or software configured to track and calculate a location and orientation of the computing system 101 in a real-world environment and maintain a correspondence in virtual space in which the virtual object is modeled. The tracking subsystem 110 also receives location and orientation information from the first controller 103, the second controller 104, and/or the tablet 105. The tracking subsystem 110 tracks and calculates the pose of the computing system 101 in real-time based upon information received from the sensors.

In some embodiments, the tracking subsystem 110 maps the environment based on the images and/or sensor data retrieved. For example, the tracking subsystem 110 extracts image features such as flat surfaces from a received first image. As a specific example, the tracking subsystem 110 uses visual-inertial odometery to combine motion data and image data to recognize and track features in an image stream obtained by the computing system 101. In some embodiments, the tracking subsystem uses Simultaneous Localization and Mapping (SLAM). SLAM involves incrementally constructing a map of the environment using key elements and landmarks within a three-dimensional environment, and may use a combination of image data and other sensor data. The tracking subsystem 110 provides the tracking information 126 to the virtual object selection subsystem 106 and the VR content generator subsystem 112.

The virtual object selection subsystem 106 includes hardware and/or software configured to identify a virtual object location 128 (i.e., a location for positioning a virtual object). In some embodiments, the virtual object selection subsystem 106 receives user input selecting a location (e.g., on a display screen). The virtual object selection subsystem 106 may further receive tracking information 126 from the tracking subsystem 110. Based on the selected location and tracking information 126, the virtual object selection subsystem 106 determines the virtual object location 128.

In some embodiments, the virtual object selection subsystem 106 generates a control plane for use in determining the location for the virtual object. The virtual object selection subsystem 106 may generate the control plane based on factors such as an initial location of the virtual object, a plane detected in an VR environment, and/or a user-selected element. For example, the virtual object selection subsystem 106 identifies a plane which is both parallel to an original surface on which a virtual object is located and intersecting a user-selected element on the virtual object. As another example, the virtual object selection subsystem 106 identifies a plane which is inclined at a predefined angle (e.g., 30 degrees, 45 degrees, 90 degrees, or 180 degrees) from a y-axis of a local coordinate system centered on the virtual object.

In some embodiments, using the control plane, the virtual object selection subsystem determines a virtual object location 128 (e.g., a new location to which to move the virtual object 120). For example, the virtual object selection subsystem 106 detects, based on user input, a selected location on the display. The virtual object selection subsystem 106 generates a pick ray emanating from a camera origin element, through the selected location, into world coordinate space. The virtual object selection subsystem 106 identifies an element at which the pick ray intersects the control plane. The element at which the pick ray intersects the control plane is set to the virtual object location 128. Upon identifying a virtual object location 128, the virtual object selection subsystem may transmit data characterizing the virtual object location 128 to the VR content generator subsystem 112.

In some embodiments, the VR content generator subsystem 112 includes hardware and/or software configured to generate virtual content. The VR content generator subsystem 112 generates VR content based upon information received from the tracking subsystem 110 and the virtual object selection subsystem 106. The VR content generator subsystem 112 receives data characterizing the virtual object location 128 from the virtual object selection subsystem 106. The VR content generator subsystem 112 analyzes the tracking information 126 and the virtual object location 128 to determine an appropriate location for the virtual object.

In some embodiments, the renderer 114 includes hardware and/or software configured to render the virtual object 120. The renderer 114 overlays the virtual object 120 on a live camera image in a location and orientation determined by the VR content generator subsystem 112 to form VR content 118. The renderer 114 transmits the VR content 118 to the display 116 for output.

In some embodiments, the display 116 includes hardware and/or software configured to present information in a visual form. For example, the display 116 is configured to display Graphical User Interface ("GUI") elements, text, images, video, and/or other data. The display 116 may include, or be communicatively coupled with, elements for receiving user input (e.g., the display 116 may be a touchscreen display). The display 116 presents the VR content 118 including virtual object 120. In some embodiments, the display 116 is part of an output device (e.g., a monitor, mobile phone, or the like which includes the display 116).

Figure 2:
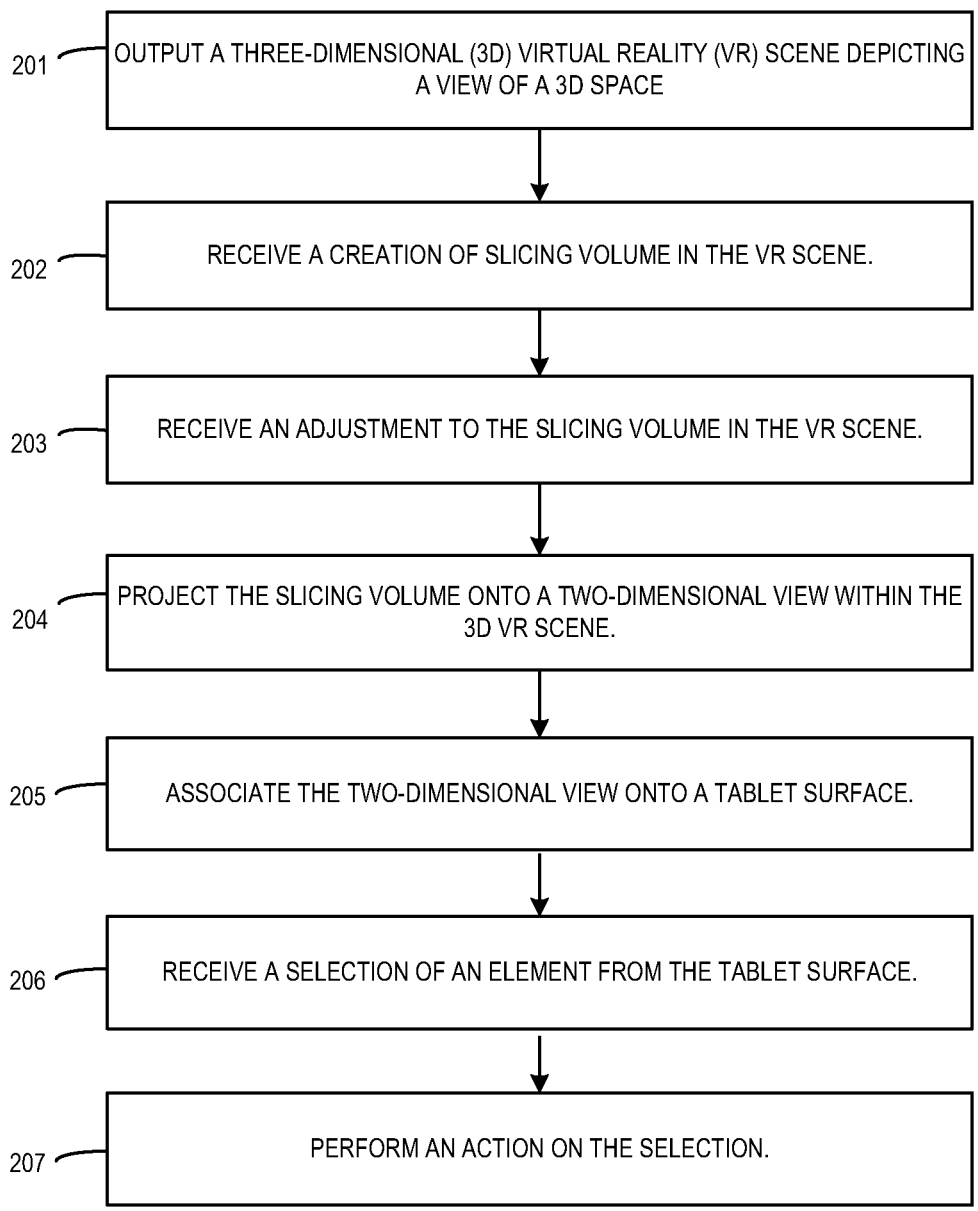
FIG. 2 is a flow chart depicting an example of a process for selecting elements within a virtual reality scene, in accordance with an embodiment.

FIG. 2 is a flow chart depicting an example of a process 200 for selecting elements within a virtual reality scene, in accordance with an embodiment. Computing system 101 can execute process 200. Process 200 includes blocks 201-207. In some cases, one or more of blocks 201-207 may not be performed.

In some cases, before performing process 200, computing system 101 detects whether a selection mode is active. A selection mode can permit the user to select a slicing volume or elements within the slicing volume and may restrict other types of interactions. Selection mode can be activated in different ways, for example, by invoking a control on one or more controllers 103-104 or by tablet 105. Once selection mode is activated, the computing system 101 is configured to receive inputs from the user such as commands to create a slicing volume and/or select elements within the slicing volume.

Figure 4:
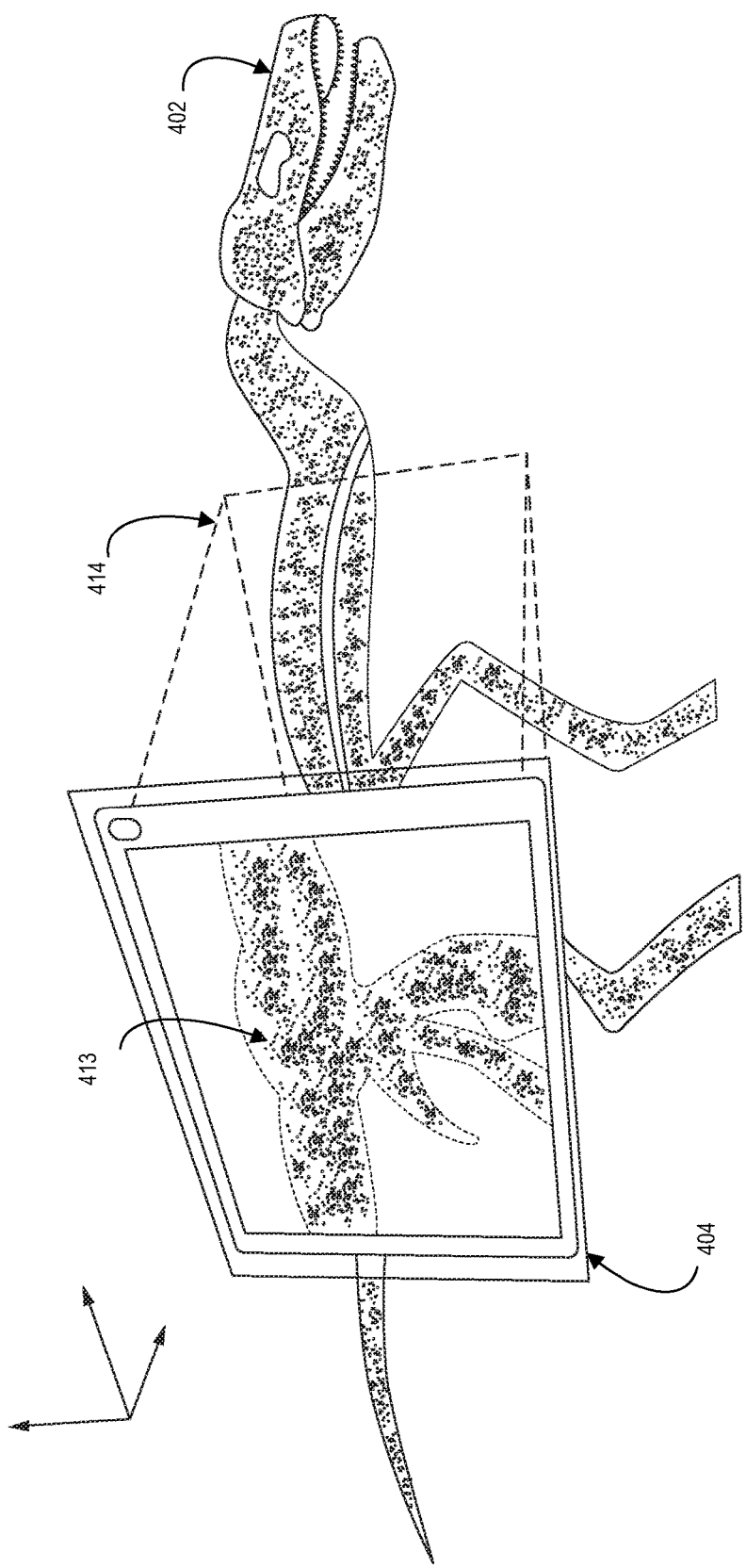
FIG. 4 is a diagram depicting an additional example of a creation of a slicing volume within a virtual reality scene, in accordance with an embodiment.

At block 201, process 200 outputting, via an output device, a three-dimensional (3D) virtual reality (VR) scene depicting a view of a three-dimensional (3D) virtual space. For discussion purposes, FIG. 2 is discussed with reference to FIGS. 3 and 4. FIGS. 3 and 4 depict examples of operations and user interactions that can occur in conjunction with blocks 201-207.

For example, FIG. 3 depicts examples of selecting elements within a virtual reality scene, in accordance with an embodiment. FIG. 3 includes FIGS. 3A-3E, each of which represent different interactions with the virtual scene. For example, FIG. 3A depicts a virtual scene. FIG. 3A includes user 300, headset 301, object 302, controller 303, tablet 304, and elements 310a-n. User 300 is wearing headset 301, which includes a display (e.g., display 116). Headset 301 displays the virtual scene, including object 302. As shown, object 302, a bunny rabbit, includes elements 310a-n. But as discussed, object 302 can be any object that can be represented in 3D. Any number of elements are possible. Elements 310a-n can be points or groups of points that make up object 302. In some cases, tablet 304 is connected to another controller (not depicted), which can provide additional controls such as buttons or a joystick.

At block 202, process 200 involves receiving a creation of a slicing volume in the VR scene. The creation of the slicing volume can be achieved using different methods, for example, by using one or more controllers or the tablet surface.

Referring again to FIG. 3, FIG. 3B depicts a selection of a slicing volume. To select the slicing volume, user 300 interacts with the virtual reality scene using either the first or the second controller. Examples of suitable interactions include mid-air gestures such as swiping right, left, up, or down. User 300 can use controller 303 to select slicing volume 306. In another example, to select the slicing volume, user 300 can align tablet 105 with the virtual reality scene such that the tablet indicates the desired slicing volume. One such example is shown in FIG. 4.

FIG. 4 is a diagram depicting an additional example of a creation of a slicing volume within a virtual reality scene, in accordance with an embodiment. FIG. 4 depicts virtual reality environment 400, which includes object 402, tablet surface 404, projection 413, and projection lines 414. Object 402 is a dinosaur. In the example depicted by FIG. 4, a user raises tablet surface 404 within the virtual scene to frame a desired selection volume. In response, computing system 101 detects the desired selection volume and projects the desired selection onto the tablet 304. As depicted, a selected part of object 402 is shown as projection 413. In some cases, computing system 101 also depicts projection lines 414 in the virtual reality scene, for example, to guide the user. Projection lines 414 may or may not be shown in the virtual reality scene.

As discussed, the object and/or elements of the object that are contained within the slicing volume are displayed within the virtual environment to appear as if they are displayed on the tablet. For example, headset 301 can create the impression to user 300 that tablet image 305 is on tablet surface 404 by using virtual reality techniques. Depending on implementation, this displaying can occur earlier or later on process 200. For example, FIG. 3B includes tablet image 305, which includes objects and/or elements from the created slicing volume.

Returning to FIG. 2, at block 203, process 200 involves receiving an adjustment to the slicing volume. The user can optionally adjust the size, position, or rotation of the slicing volume. For example, FIG. 3C depicts user 300 adjusting the position and/or size of slicing volume 306. By interacting with the virtual scene, user 300 can adjust the size of the slicing volume 306, growing or shrinking slicing volume 306 in one or more of the three dimensions (x, y, z). Additionally or alternatively, user 300 can rotate slicing volume 306 in any of the three dimensions. If user 300 is satisfied with the slicing volume as selected in block 202, then process 200 proceeds to block 203.

At block 204, process 200 involves projecting the slicing volume onto a two-dimensional area. For example, computing system 101 projects the slicing volume 306, which is three-dimensional, on to a two-dimensional area. The projection can be done from the perspective of a plane in front of the slicing volume, or from any other perspective such as the perspective of an imaginary "virtual" camera. A virtual camera can be represented by a midpoint of headset 301. Another example of a projection from 3D to 2D is shown in FIG. 5.

Figure 5:
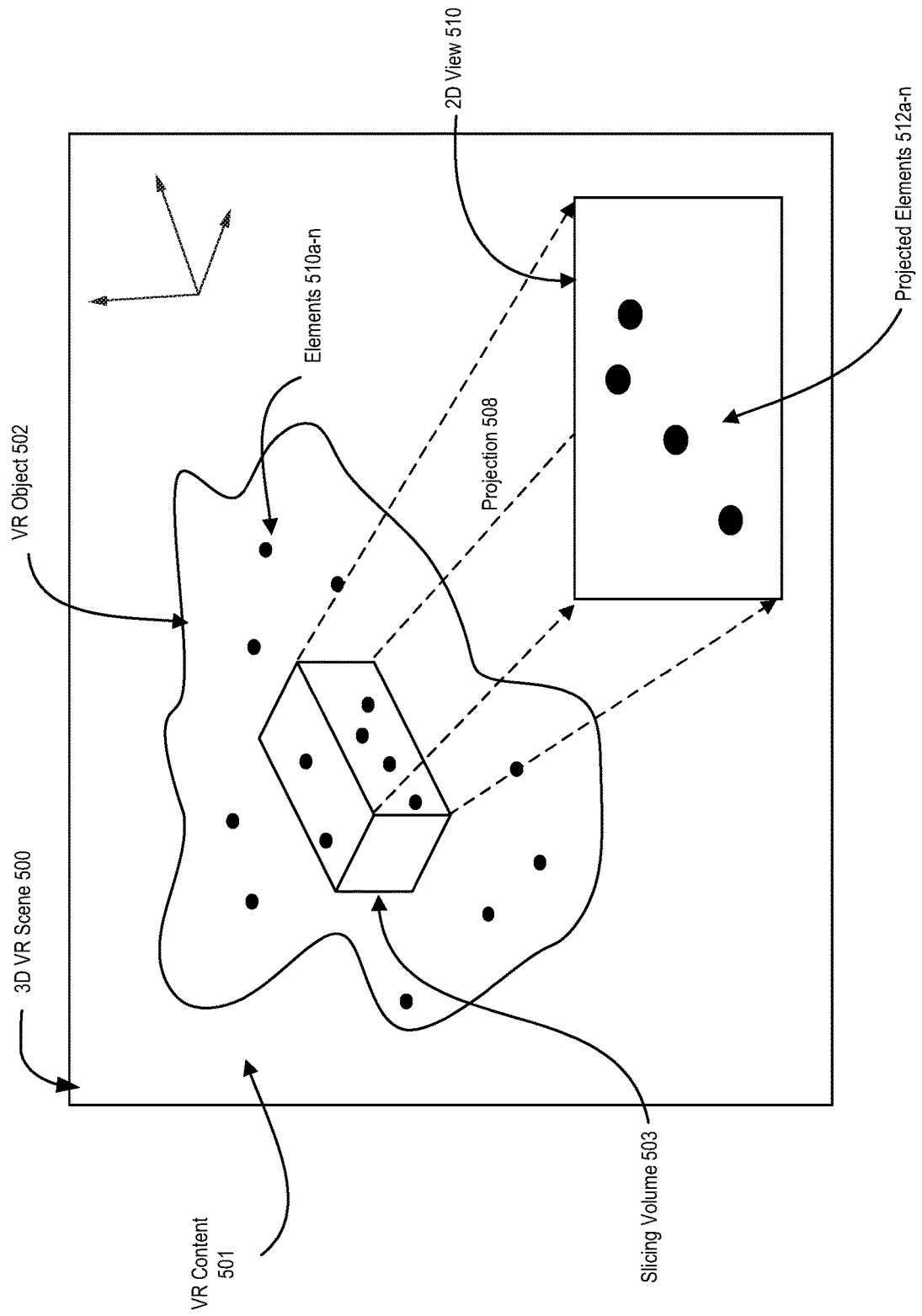
FIG. 5 is a diagram depicting an example of a projection from a 3D virtual environment to a 2D surface, in accordance with an embodiment.

FIG. 5 is a diagram depicting an example of a projection from a 3D virtual environment to a 2D surface, in accordance with an embodiment. FIG. 5 depicts 3D VR scene 500. 3D VR scene 500 is a 3D virtual environment that contains virtual or digital content, such as one or more digital elements. The 3D VR scene 500 displays a view of the 3D environment rendered from the perspective of a particular viewpoint within the 3D environment. This particular viewpoint (also referred to as the virtual viewpoint) corresponds to the position of a virtual camera. The virtual camera may be positioned based upon the positions of the user's eyes.

Figure 8:
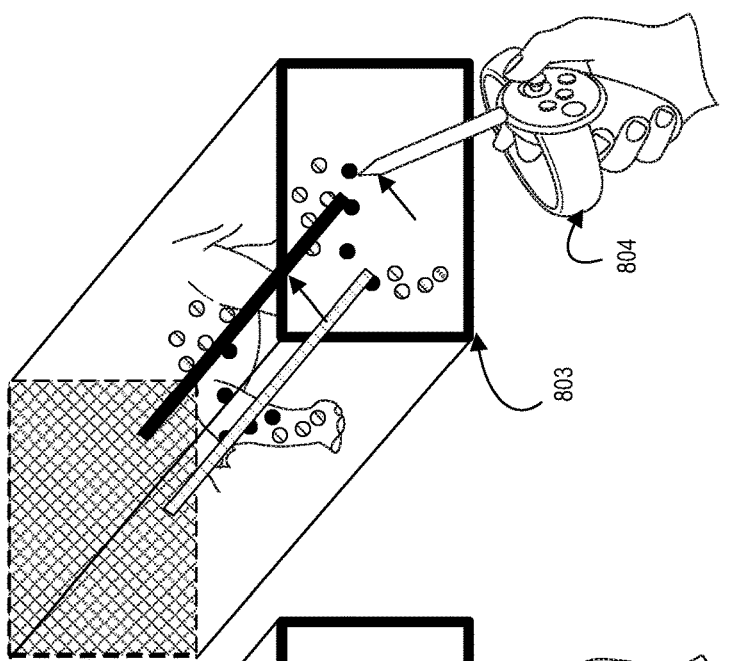
FIG. 8, which includes
Figure 8:
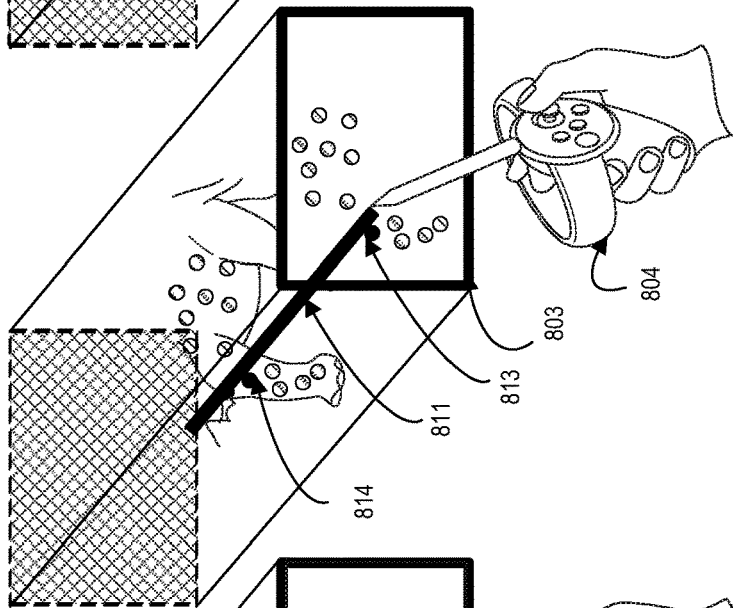
Figure 8:
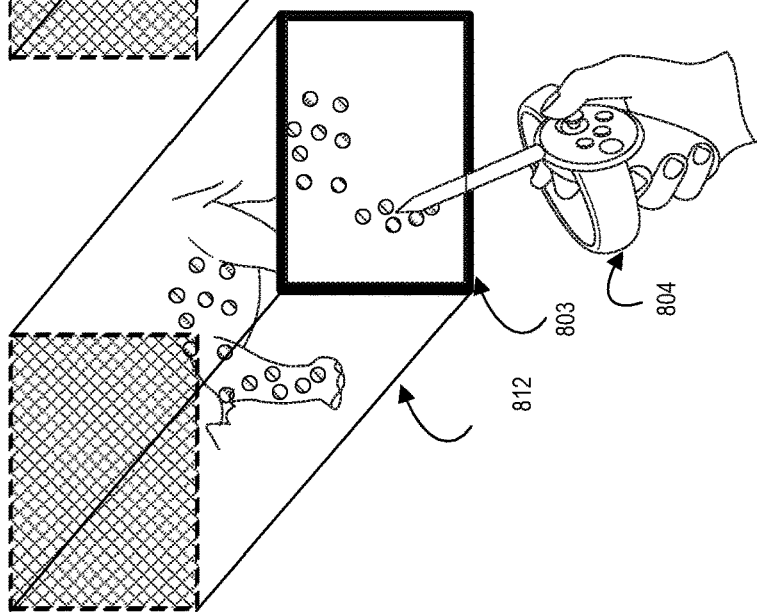

In particular, 3D VR scene 500 includes VR content 501. VR content 501 includes VR object 502 and elements 510a-n. Slicing volume 503 is shown by a rectangular prism. As depicted, slicing volume 503 is expanded into 2D view 510, which includes projected elements 512a-n. Projected elements 512a-n are a subset of elements 510a-n. 2D view 510, including projected elements 512a-n, is mapped to or associated with a tablet surface (as depicted in FIGS. 5 and 8).

At block 205, process 200 involves associating the two-dimensional view onto a tablet surface. Associating a surface of a physical object such a tablet with the two-dimensional view enables an interaction with the surface to be mapped to an interaction with the two-dimensional view. In this manner, interactions with the virtual reality scene are simplified. For example, each area on the physical tablet is linked to a corresponding area in the two-dimensional view. A selection on the physical tablet corresponds to a selection in the two-dimensional view. Additionally, the 3D pose of the tablet is tracked such that the tablet is depicted as a movable part of the VR scene and such that the part of the 3D scene that is projected into the 2D view can be updated in real time. For example, as the user moves the tablet, the 2D projection updates. FIG. 6 illustrates these concepts.

FIG. 6 is a diagram depicting an example using a tablet surface for interacting within a virtual reality scene in accordance with an embodiment. FIG. 6 depicts first controller 601, which is joined to tablet 602, and second controller 610. In the example depicted by FIG. 6, a user 600 interacts with tablet 602 using a stylus 611. Computing system 101 associates the physical surface of tablet 602 with the two-dimensional view such that interactions on an area of the tablet 602 correspond to interactions within the two-dimensional view. Accordingly, when stylus 611 is touched to tablet 602, the area of contact is mapped, via the association, to a corresponding area in the two-dimensional view. While the use of stylus 611 to interact with the two-dimensional view is depicted, other selection methods are possible. For example, touch-based interactions using fingers such as tap, swipe, and so forth are possible. Further, different operations can be accomplished using the stylus 611 or touch, or both, such as selection, deselection, rotation, and so forth.

As can be seen, tablet 602 is joined via arm 605 to first controller 601. Arm 605 can provide flexibility in configuration, such as being adapted for different users with different sizes of arms or abilities. Arm 605 provides for adjustment of relative position and angle of tablet 602 and first controller 601. Additionally, the connection of tablet 602 and first controller 601 facilitates the tracking of the 3D pose (position and orientation) of tablet 602 via sensors in controller 601. Because the controller 601 can track the 3D pose of the tablet 602, the pose of tablet 602 can be assigned to be equal to the 3D pose of the controller 601. Once the 3D pose of the physical tablet is known, the 2D view can be updated based on control signals received from controller 601. For example, if a user moves tablet 602 from left to right, the user will see the 2D view moving from left to right within the virtual reality environment.

Turning again to FIG. 3, FIG. FIG. illustrates an example of the two-dimensional projection. FIG. FIG. includes projected elements 307 which are depicted on the tablet 304. Projected elements 307 represent elements that are associated with the object 302 but are contained within slicing volume 306. Computing system 101 associates tablet 304 with the contents of the two-dimensional area.

The tablet surface need not actually display the representation. Rather, the virtual reality environment displays the projection within the three-dimensional environment (e.g., via a headset) as if the projection appears on the surface. This visibility can be accomplished using a tracked VR controller that is attached to the tablet. This attachment device allows the physical location of the tablet surface, and the associated two-dimensional view, to be tracked and visible in the VR environment. Therefore, the user can visualize the tablet moving and the mapped two-dimensional view on the tablet moving in real-time.

By displaying the projected elements 307 on tablet 304, user 300 can easily select one or more of the projected elements 307. The user may now interact with the slicing volume before selecting any elements or proceed directly to selecting any elements.

At block 206, process 200 involves receiving a selection of an element from the tablet surface. With the slicing volume defined and projected onto a two-dimensional surface, the user can select, deselect, or otherwise interact with elements contained within the slicing volume. Selection can occur by interacting with the tablet surface.

In some cases, the elements can be identified by ray tracing. For example, a user can tap or touch a point on the tablet screen, causing a ray to be extended at a point corresponding within the slicing volume that corresponds to the point at which the user tapped or touched the screen, backwards through the slicing volume. Any object elements that intersect the ray are selected. Turning again to FIG. 3, FIG. 3E depicts using ray tracing to select elements within the slicing volume. For example, FIG. 3E depicts ray 311, which is caused by user 300's selection of selected element 312. User 300 selects element 312, which causes ray 311 to be projected through the slicing volume 306.

Figure 7:
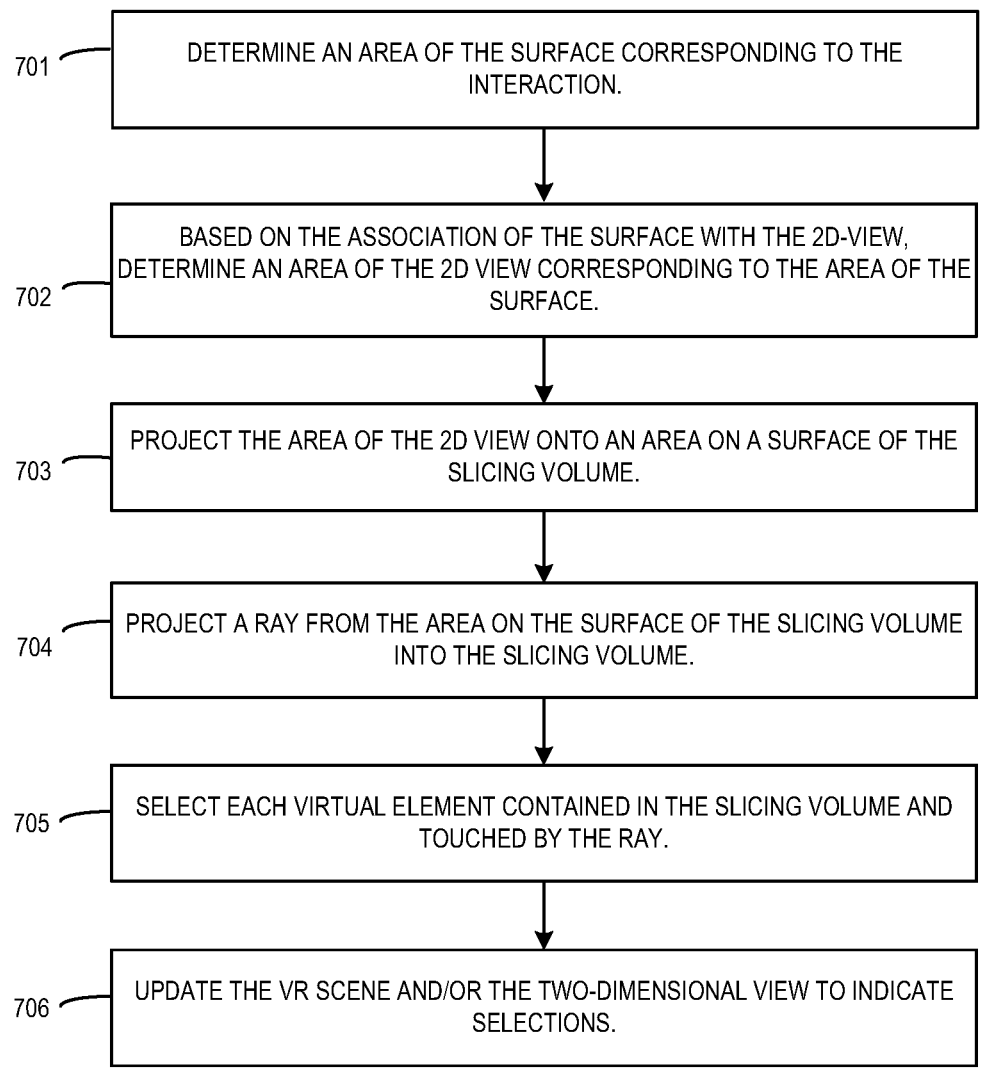
FIG. 7 is a flow chart depicting an example of a process for selection of elements by using a tablet surface within a virtual reality scene, in accordance with an embodiment.

A more detailed explanation of the operations that can be performed in block 206 is discussed in FIG. 7. But other interactions are possible, such as standard touch, drag, or swipe interactions. Once one or more elements are selected, small adjustments can be made to which elements are selected. For example, a pen, pencil or other interaction can be used.

At block 207, process 200 involves performing an action on the selection. Actions include exporting, saving, printing, or otherwise transmitting the set of elements which are selected.

FIG. 7 is a flow chart depicting an example of a process 700 for selection of elements by using a tablet surface within a virtual reality scene, in accordance with an embodiment. Computing system 101 can execute process 700, which describes mapping an interaction with a surface to a selection of an element. As discussed, an exemplary controller and tablet configuration is discussed with respect to FIG. 6. For example, a user can interact with the environment using a first controller that is attached to a tablet surface and a second controller with a stylus. For illustrative purposes, FIG. 7 is also discussed with respect with FIG. 8.

FIG. 8, which includes FIGS. 8A-8C, depicts examples of using ray casting to select elements within a virtual reality scene, in accordance with an embodiment. FIG. 8A depicts performing a selection of a contact point by using a stylus, FIG. 8B depicts an initial selection of elements via ray casting, and FIG. 8C depicts a subsequent selection of elements via ray casting at multiple elements. FIG. 8 depicts one such example.

At block 701, process 700 involves determining an area of the surface corresponding to the interaction. Computing system 101 registers the tap performed by the user by using standard techniques such as a change in capacitance of the surface of the tablet 803 such as tapping on tablet 803 with the stylus of the controller 804.

At block 702, process 700 involves determining an area of the 2D view that corresponds to the area of the surface based on the association of the surface with the two-dimensional view. For example, computing system 101 uses the association generated at block 701, specifically, the association of the area with a corresponding area on the 2D.

At block 703, process 700 involves projecting the area of the 2D view onto an area on a surface of the slicing volume. Computing system 101 maps the area of the 2D view onto a corresponding area on the surface of the slicing volume. An example of projection is discussed with respect to FIG. 5.

At block 704, process 700 involves projecting a ray from the area on the surface of the slicing volume into the slicing volume. For example, as depicted in FIG. 8B, the signal generated at block 701 causes a ray 811 to be generated and cast into the slicing volume. The ray 811 may or may not be visualized in the virtual reality scene.

At block 705, process 700 involves selecting each virtual element contained within the slicing volume and touched by the ray. All elements that intersect the ray 811 are selected.

At block 706, process 700 involves updating the virtual reality scene and/or the two-dimensional view to indicate selections. The selected elements can be visually indicated in some manner, for example, by changing the color of the selected elements relative to the unselected elements. Continuing the example, element 814 is highlighted.

As illustrated in FIG. 8C, the ray 811 can be moved in directions. For example, in FIG. 8C, the user swipes right with controller 804 while selecting or touching the surface of the tablet 803. Computing system 101 continues to select the elements intersected by the ray 811 as it moves based on the user's movement of the controller 804.

Figure 9:
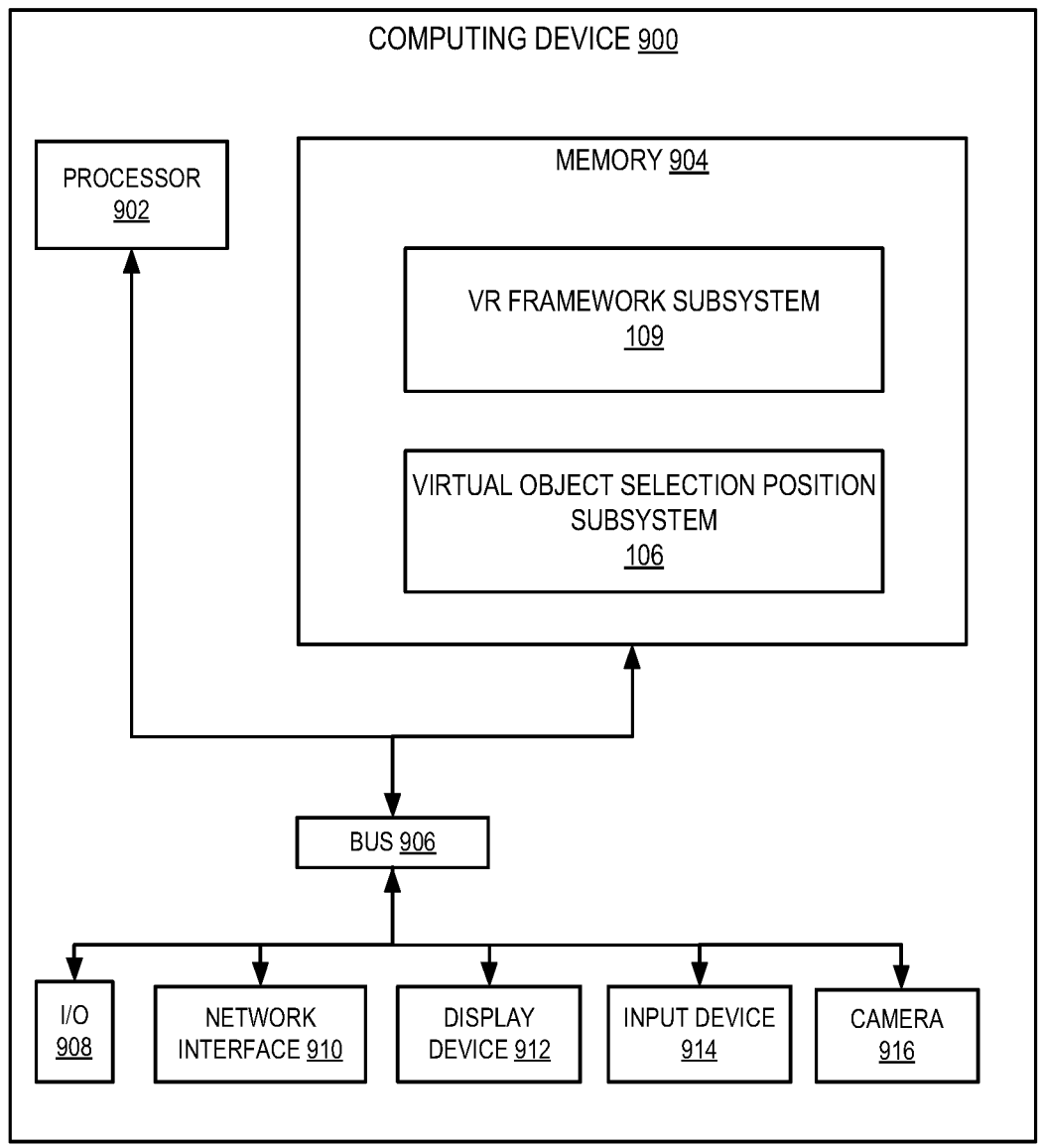
FIG. 9 depicts an example of a computing system that performs certain operations described herein, according to certain embodiments.

FIG. 9 depicts an example of a computing system that performs certain operations described herein, according to certain embodiments. Any suitable computing system or group of computing systems can be used for performing the operations described herein. For example, FIG. 9 depicts examples of a computing device 900 that executes an VR framework subsystem 109 and a virtual object selection subsystem 106 (as described above with respect to FIG. 2). Computing device 900 depicted in FIG. 9 may be used to implement various systems, subsystems, and servers described in this disclosure.

The depicted examples of a computing device 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing device 900 may also include a number of external or internal devices, such as input or output devices. For example, the computing device 900 is shown with one or more input/output ("I/O") interfaces 908. An I/O interface 909 can receive input from input devices (e.g., input device 914) or provide output to output devices (e.g., display device 912). One or more buses 906 are also included in the computing device 900. The bus 906 communicatively couples one or more components of a respective one of the computing device 900.

The computing device 900 executes program code that configures the processor 902 to perform one or more of the operations described herein. The program code may correspond to the VR framework subsystem 109 and the virtual object selection subsystem 106 and/or other suitable applications that perform one or more operations described herein. The program code may be resident in the memory device 904 or any suitable computer-readable medium and may be executed by the processor 902 or any other suitable processor. In some embodiments, the VR framework subsystem 109 and virtual object selection subsystem 106 are stored in the memory device 904, as depicted in FIG. 9. In additional or alternative embodiments, one or more of the VR framework subsystem 109 and virtual object selection subsystem 106 are stored in different memory devices of different computing systems. In additional or alternative embodiments, the program code described above is stored in one or more other memory devices accessible via a data network.

In some embodiments, one or more of these data sets, models, and functions are stored in the same memory device (e.g., the memory device 904). For example, a device, such as the computing system 101 depicted in FIG. 1, can host the VR framework subsystem 109 and virtual object selection subsystem 106. In additional or alternative embodiments, one or more of the programs, data sets, models, and functions described herein are stored in one or more other memory devices accessible via a data network.

The computing device 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and the like. The computing device 900 is able to communicate with one or more other computing devices via a data network using the network interface device 910. The computing device 900 also includes a camera 916.

Figure 10:
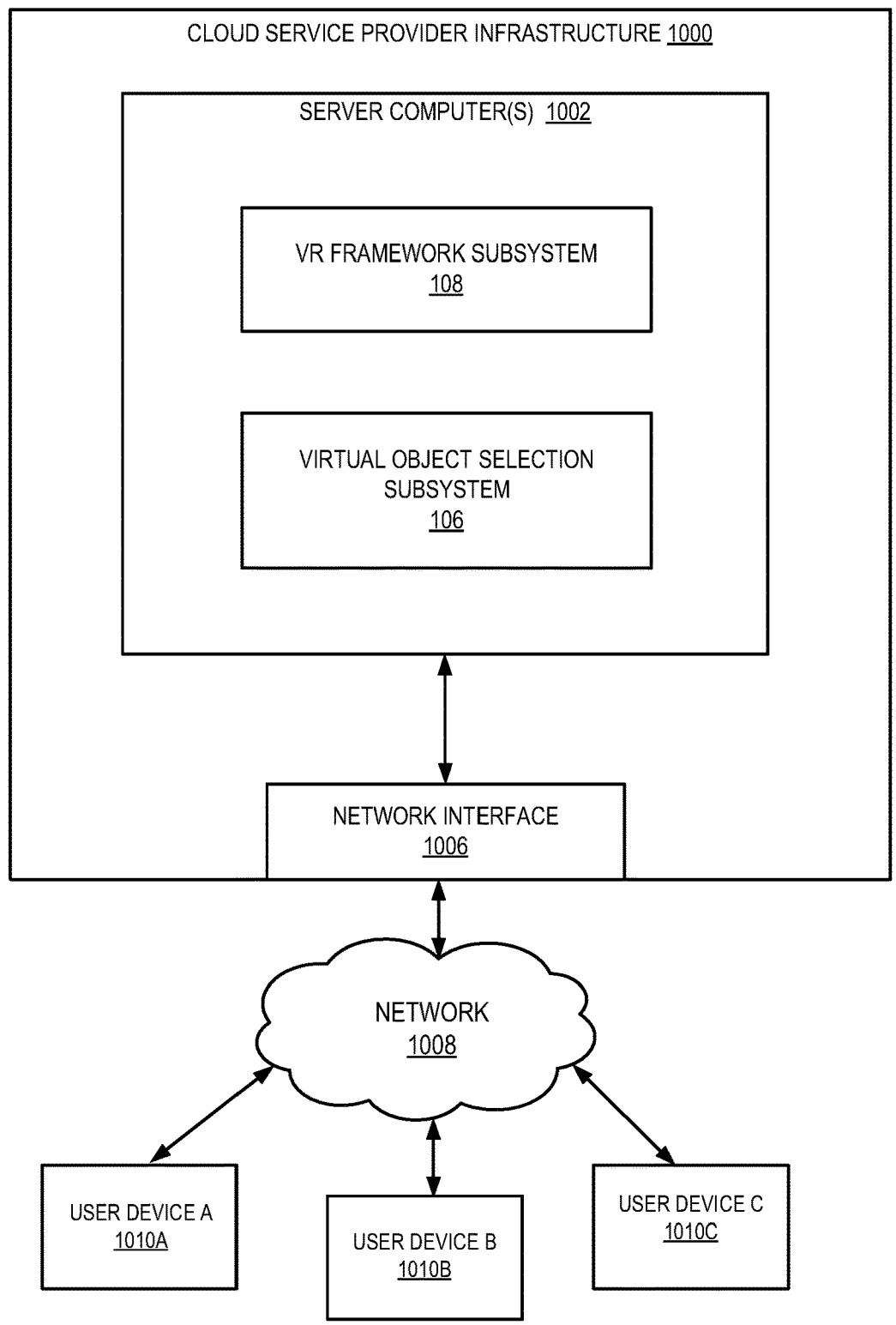
FIG. 10 depicts another example of a computing system that performs certain operations described herein, according to certain embodiments.

FIG. 10 depicts another example of a computing system that performs certain operations described herein, according to certain embodiments. FIG. 10 depicts an example of a cloud service provider infrastructure 1000 offering one or more services including a service that offers virtual object functionality as described in this disclosure. Such a service can be subscribed to and used by a number of user subscribers using user devices 1010A, 1010B, and 1010C across a network 1008. The service may be offered under a Software as a Service (SaaS) model. One or more users may subscribe to such a service.

In the embodiment depicted in FIG. 10, the cloud service provider infrastructure 1000 includes one or more server computer(s) 1002 that are configured to perform processing for providing one or more services offered by the cloud service provider. One or more of server computer(s) 1002 may implement an VR framework subsystem 108 (which could provide functionalities similar to virtual object selection subsystem 106 depicted in FIG. 1) and a virtual object selection subsystem 106 (which could provide functionalities similar to virtual object selection subsystem 106 depicted in FIG. 1). Virtual object selection subsystem 106 and VR framework subsystem 108 may be implemented using software only (e.g., code, program, or instructions executable by one or more processors provided by cloud service provider infrastructure 1000), in hardware, or combinations thereof. For example, one or more of the server computer(s) 1002 may execute software to implement the services and functionalities provided by VR framework subsystem 108 and virtual object selection subsystem 106, where the software when executed by one or more processors of the server computer(s) 1002 causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 1002 can include volatile memory, non-volatile memory, or a combination thereof.

In the embodiment depicted in FIG. 10, cloud service provider infrastructure 1000 also includes a network interface device 1006 that enables communications to and from cloud service provider infrastructure 1000. In certain embodiments, the network interface device 1006 includes any device or group of devices suitable for establishing a wired or wireless data connection to the network 1008. Non-limiting examples of the network interface device 1006 include an Ethernet network adapter, a modem, and/or the like. The cloud service provider infrastructure 1000 is able to communicate with the user devices 1010A, 1010B, and 1010C via the network 1008 using the network interface device 1006.

A digital scene, for example, an VR scene, may be displayed by a user device, for example, by user device 1010A. The VR scene may display a virtual object along with real-world content. The display of the scene may be facilitated by VR framework subsystem 108. A user of user device 1010A may interact with the displayed virtual object and translate the virtual object from an initial location to a new location, for example, by using a finger gesture on a touchscreen of user device 1010A. In response, processing for translating the virtual object may be performed by virtual object selection subsystem 106 and the scene displayed on user device 1010A updated to show the smooth and realistic translation of the virtual object.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device. Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including, but not limited to, conventional techniques for inter-process communications, and different pairs of processes may use different techniques, or the same pair of processes may use different techniques at different times.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method performed by one or more computing systems, the method comprising:
   outputting, via an output device, a three-dimensional virtual reality scene (3D VR scene) depicting a view of a three-dimensional virtual space (3D space);
   displaying a three-dimensional virtual object (3D VR object) in the 3D virtual space, the 3D virtual object represented by a point cloud including a plurality of virtual elements;
   responsive to detecting a raising of a physical object, displaying a three-dimensional slicing volume (3D slicing volume) at a position in the 3D VR scene based upon the position of the physical object;
   responsive to user interactions with the 3D slicing volume within the 3D VR scene, changing a size and a position of the 3D slicing volume within the 3D VR scene such that a portion of the 3D virtual object is contained within the 3D slicing volume, the portion of the 3D virtual object containing a subset of virtual elements from the plurality of virtual elements in the point cloud;
   projecting, based upon a particular viewpoint within the 3D VR scene, the subset of virtual elements contained in the 3D slicing volume onto a two-dimensional view (2D view);
   displaying, in the 3D VR scene, the 2D view along with the 3D slicing volume and the 3D virtual object;
   associating a surface of the physical object with the 2D view, the association enabling an interaction with the surface of the physical object to be mapped to an interaction with the 2D view displayed in the 3D VR scene;
   receiving information indicative of an interaction with an area on the surface of the physical object;
   selecting, from the subset of virtual elements, one or more virtual elements based upon the interaction with the area;
   updating the 3D VR scene to indicate the selected one or more virtual elements in the 3D VR scene; and
   updating the 2D view displayed in the 3D VR scene to indicate the selected one or more virtual elements in the 2D view.

2. The method of claim 1, further comprising identifying the 3D slicing volume based on an additional user interaction.

3. The method of claim 1, further comprising:
   receiving an additional interaction comprising an adjustment to the size of the 3D slicing volume; and
   adjusting, within the 3D VR scene, the size of the 3D slicing volume.

4. The method of claim 1, further comprising:
   receiving an additional interaction comprising an adjustment to the position of the 3D slicing volume; and
   adjusting, within the three-dimensional virtual reality scene, the position of the 3D slicing volume.

5. The method of claim 1, further comprising highlighting at least one virtual element from the set of one or more virtual elements in the 2D view.

6. The method of claim 1, wherein indicating the selected one or more virtual elements in the 3D VR scene comprises 3D VR scene outside the 2D view.

7. The method of claim 1, wherein the selecting comprises:
   determining the area of the surface corresponding to the interaction;
   based upon the association, determining an area of the 2D view corresponding to the area of the surface;
   projecting the area of the 2D view onto an area on a surface of the 3D slicing volume;
   projecting a ray from the area on the surface of the 3D slicing volume into the 3D slicing volume; and
   selecting each virtual element contained in the 3D slicing volume and touched by the ray.

8. The method of claim 1, wherein the interaction comprises an object touching the surface, wherein the object includes a stylus or a finger.

9. The method of claim 1, further comprising providing haptic feedback that indicates that the one or more virtual elements are selected.

10. The method of claim 1, wherein updating the 3D VR scene to indicate the selected one or more virtual elements in the 3D VR scene comprises changing a display color of the selected one or more virtual elements relative to a display color of unselected virtual elements of the point cloud.

11. A virtual reality system comprising:
a physical object comprising a surface;
a display; and
a computing device configured to:
   create a three-dimensional virtual reality scene (3D VR scene) depicting a view of a three-dimensional virtual space (3D virtual space);
   display, via the display, a three-dimensional virtual object (3D virtual object) in the 3D virtual space, the 3D virtual object represented by a point cloud comprising a plurality of virtual elements;
   responsive to detecting a raising of the physical object, displaying a three-dimensional slicing volume (3D slicing volume) at a position in the 3D VR scene based upon the position of the physical object;
   responsive to user interactions with the 3D slicing volume in the 3D VR scene, changing a size and a position of the 3D slicing volume within the 3D VR scene such that a portion of the 3D virtual object is contained within the 3D slicing volume, the portion of the 3D virtual object containing a subset of virtual elements from the plurality of virtual elements in the point cloud;
   project, via the display and based upon a particular viewpoint within the 3D VR scene, the subset of virtual elements contained in the 3D slicing volume onto a two-dimensional view (2D view);
   associate a surface of the physical object with the 2D view, the association enabling an interaction with the surface of the physical object to be mapped to an interaction with the 2D view displayed in the 3D VR scene;
   receive information indicative of an interaction with an area on the surface of the physical object;
   select, from the subset of virtual elements, one or more virtual elements based on the interaction with the area;
   update, via the display, the 3D VR scene to indicate the selected one or more virtual elements in the 3D VR scene; and
   update, via the display, the 2D view displayed in the 3D VR scene to indicate the selected one or more virtual elements in the 2D view.

12. The virtual reality system of claim 11, further comprising a controller device configured to receive inputs, wherein the computing device is further configured to:
   receive an additional interaction, via the controller device, the additional interaction comprising an adjustment to the size of the 3D slicing volume; and
   adjust, within the 3D VR scene, the size of the 3D slicing volume.

13. The virtual reality system of claim 11, further comprising a controller device configured to receive inputs, wherein the computing device is further configured to:
   receive an additional interaction, via the controller device, the additional interaction comprising an adjustment to the position of the 3D slicing volume; and
   adjust, within the three-dimensional virtual reality scene, the position of the slicing volume.

14. The virtual reality system of claim 11, wherein the computing device is further configured to cause the display to highlight the one or more virtual elements in the 3D VR scene outside the 2D view.

15. The virtual reality system of claim 11, wherein the selecting comprises:
   determining an area of the physical object surface corresponding to the interaction;
   based upon the association, determining an area of the 2D view corresponding to the area of the physical object surface;
   projecting the area of the 2D view onto an area on a surface of the 3D slicing volume;
   projecting a ray from the area on the surface of the 3D slicing volume into the 3D slicing volume; and
   selecting each virtual element contained in the 3D slicing volume and touched by the ray.

16. A non-transitory computer-readable medium having program code that is stored thereon, wherein the program code is executable by one or more processing devices for performing operations comprising:
   outputting, via an output device, a three-dimensional virtual reality scene (3D VR scene) depicting a view of a three-dimensional virtual space (3D virtual space);
   displaying a three-dimensional virtual object (3D virtual object) in the 3D virtual space, the 3D virtual object represented by a point cloud comprising a plurality of virtual elements;
   responsive to detecting a raising of a physical object, displaying a three-dimensional slicing volume (3D slicing volume) at a position in the 3D VR scene based upon the position of the physical object;
   responsive to user interactions with the 3D slicing volume in the 3D VR scene, changing a size and a position of the 3D slicing volume within the 3D VR scene such that a portion of the 3D virtual object is contained within the 3D slicing volume, the portion of the 3D virtual object containing a subset of virtual elements from the plurality of virtual elements in the point cloud;
   projecting, based upon a particular viewpoint within the 3D virtual scene, the subset of the virtual elements contained in the 3D slicing volume onto a two-dimensional view (2D view);
   displaying, in the 3D VR scene, the 2D view along with the 3D slicing volume and the 3D virtual object;
   associating a surface of the physical object with the 2D view, the association enabling an interaction with the surface of the physical object to be mapped to an interaction with the 2D view displayed in the 3D VR scene;
   receiving information indicative of an interaction with an area on the surface of the physical object;
   selecting, from the subset of virtual elements, one or more virtual elements based upon the interaction with the area;
   updating the 3D VR scene to indicate the selected one or more virtual elements in the 3D virtual scene; and
   updating the 2D view displayed in the 3D VR scene to indicate the selected one or more virtual elements in the 2D view.

17. The non-transitory computer-readable medium of claim 16, further comprising receiving an additional user interaction indicating the 3D slicing volume.

18. The non-transitory computer-readable medium of claim 16, wherein the selecting comprises:

determining an area of the surface corresponding to the interaction;
based upon the association, determining an area of the 2D view corresponding to the area of the surface;
projecting the area of the 2D view onto an area on a surface of the 3D slicing volume;
projecting a ray from the area on the surface of the 3D slicing volume into the 3D slicing volume; and
selecting each virtual element contained in the 3D slicing volume and touched by the ray.

* * * * *